US007167066B2

(12) United States Patent
Wang

(10) Patent No.: US 7,167,066 B2
(45) Date of Patent: Jan. 23, 2007

(54) GROUND FAULT CIRCUIT INTERRUPTER WITH REVERSE WIRING PROTECTION

(75) Inventor: Ping Wang, Chuzhou (CN)

(73) Assignee: Wenzhou Sansheng Electrical Co., Ltd., Zhejiang (CN)

( * ) Notice: Subject to any disclaimer, the term of this patent is extended or adjusted under 35 U.S.C. 154(b) by 0 days.

(21) Appl. No.: 10/945,672

(22) Filed: Sep. 21, 2004

(65) Prior Publication Data

US 2006/0044086 A1 Mar. 2, 2006

(30) Foreign Application Priority Data

Sep. 1, 2004 (CN) ........................ 2004 2 0079238

(51) Int. Cl.
*H02H 3/00* (2006.01)

(52) U.S. Cl. ........................................... 335/18; 361/42

(58) Field of Classification Search .................. 335/18; 361/42–51
See application file for complete search history.

(56) References Cited

U.S. PATENT DOCUMENTS 4,802,052 A * 1/1989 Brant et al. .................... 361/42
5,363,269 A 11/1994 McDonald
5,541,800 A 7/1996 Misencik
6,040,967 A 3/2000 DiSalvo
6,111,733 A 8/2000 Neiger et al.
6,226,161 B1 5/2001 Neiger et al.
6,246,558 B1 6/2001 DiSalvo et al.
6,282,070 B1 8/2001 Ziegler et al.
6,381,112 B1 4/2002 DiSalvo
6,437,953 B1 8/2002 DiSalvo et al.
6,580,344 B1 6/2003 Li
6,611,406 B1 8/2003 Neiger et al.
6,628,486 B1 9/2003 Macbeth
6,646,838 B1 11/2003 Ziegler et al.
6,657,834 B1 12/2003 DiSalvo
6,734,769 B1 5/2004 Germain et al.
6,937,452 B1 * 8/2005 Chan et al. ................... 361/42
2003/0086220 A1 5/2003 Nelson
2004/0070474 A1 4/2004 Wu et al.
2004/0070897 A1 4/2004 Wu et al.

* cited by examiner

*Primary Examiner*—Ramon M. Barrera
(74) *Attorney, Agent, or Firm*—Hogan & Hartson LLP

(57) ABSTRACT

A circuit interrupter comprises a pair of fixed contact strips, a pair of movable contact strips, a reset component, a movable component, and a tripping component that contains a reset contact. Each of the fixed contact strips has a fixed contact. Each of the movable contact strips has a fixed end and a movable end which has a movable contact arranged for contacting one of the corresponding fixed contacts. The movable component is disposed to sustain the movable ends of the movable contact strips and is capable of either being latched with or released from the reset component to move between a first position where the movable contacts are separated from the fixed contacts and the movable contact strips are separated from the reset contact, a second position where either the movable contact strip contacts the reset contact and the movable contacts are separated from the fixed contacts, and a third position where the movable contacts make contact with the respective fixed contacts and the movable contact strips are separated from the reset contact. The tripping component is capable of latching the reset component with the movable component for the movable component to move to the third position upon detection of a reset request and releasing the reset component from the movable component for movable component to move to the first position upon detection of a fault condition.

12 Claims, 16 Drawing Sheets

GROUND FAULT CIRCUIT INTERRUPTER WITH REVERSE WIRING PROTECTION

FIELD OF THE INVENTION

The present invention relates to a ground fault circuit interrupter (GFCI) device for protecting an alternating current load circuit, and more particularly to a GFCI with reverse wiring protection.

BACKGROUND

With the increasing use of household electrical appliances, people demand that receptacles installed in their houses be capable of protecting them from serious injury when accidentally touched or other ground fault conditions occur. Thus, ground fault circuit interrupters are designed to break the electrical continuity upon detecting a ground fault condition occurring at an alternating current (AC) load.

Many electrical wiring devices including receptacles have a line side that is connectable to an electrical power supply, and a load side that is connectable to one or more loads and at least one conductive path between the line side and load side. When a person accidentally comes in contact with the line side of the AC load and an earth ground at the same time, a serious injury may occur because the human body forms another conductive path for the electrical current to flow through. There is a strong desire for electrical wiring devices that can break electric power supply to various loads such as household appliances and consumer electronic products.

The GFCI devices can detect a ground fault condition and break the electric power supply by employing a sensing transformer to detect an imbalance between the currents flowing in the phase (also known as "hot") and neutral conductive paths of the power supply. A ground fault condition happens when the current is diverted to the ground through another path such as a human body, that results in an imbalance between the currents flowing in the phase and neutral conductors. Upon detection of a ground fault condition, a breaker within the GFCI devices is immediately tripped to interrupt the electrical continuity and removes all power supply to the loads.

Some circuit interrupters, such as a GFCI receptacles, have a user accessible load in addition to the line side and load side connections. Users can connect other household appliances to the power supply through plug entries on the receptacle. However, due to the similarity of line side and load side terminals, instances may occur where the line wires are connected to the load side connection and the load wires are connected to the line side connection. This is known as reverse wiring. When reverse wiring occurs, the GFCI devices usually do not provide ground fault protection to the user accessible load. It is a problem if there is no warning provided to an installer when the GFCI devices have reverse wiring. Thus, it is desired to design a GFCI device which can disable the reset function when the GFCI device has a reverse wiring.

In addition, because of the high stability requirement of the GFCI devices' quality, it is also desired for GFCI devices to have a simpler design, less components so that they are easier to be assembled, installed, and correctly wired.

SUMMARY OF THE INVENTION

One embodiment of the invented circuit interrupter comprises a pair of fixed contact strips, a pair of movable contact strips, a reset component, a movable component, and a tripping component that contains a reset contact. Each of the fixed contact strips has a fixed contact. Each of the movable contact strips has a fixed end and a movable end which has a movable contact arranged for contacting one of the corresponding fixed contacts. The movable component is disposed to sustain the movable ends of the movable contact strips and is capable of either being latched with or released from the reset component to move between a first position where the movable contacts are separated from the fixed contacts and the movable contact strips are separated from the reset contact, a second position where either the movable contact strip contacts the reset contact and the movable contacts are separated from the fixed contacts, and a third position where the movable contacts make contact with the respective fixed contacts and the movable contact strips are separated from the reset contact. The tripping component is capable of latching the reset component with the movable component for the movable component to move to the third position upon detection of a reset request and releasing the reset component from the movable component for the movable component to move to the first position upon detection of a fault condition.

In the embodiment, the reset component, the movable component, and the tripping component employ some elastic tubes such as springs to achieve a reset function and a trip function. By using elastic forces, the embodiment has the advantages of less manufacturing costs, convenient assembling, and a stable quality.

BRIEF DESCRIPTION OF THE DRAWINGS

A more complete understanding of the present invention can be obtained by reference to the detailed description of embodiments in conjunction with the accompanying drawings. These drawings depict only a typical embodiment of the invention and do not therefore limit its scope. They serve to add specificity and details, in which.

DETAILED DESCRIPTION

Figure 1:
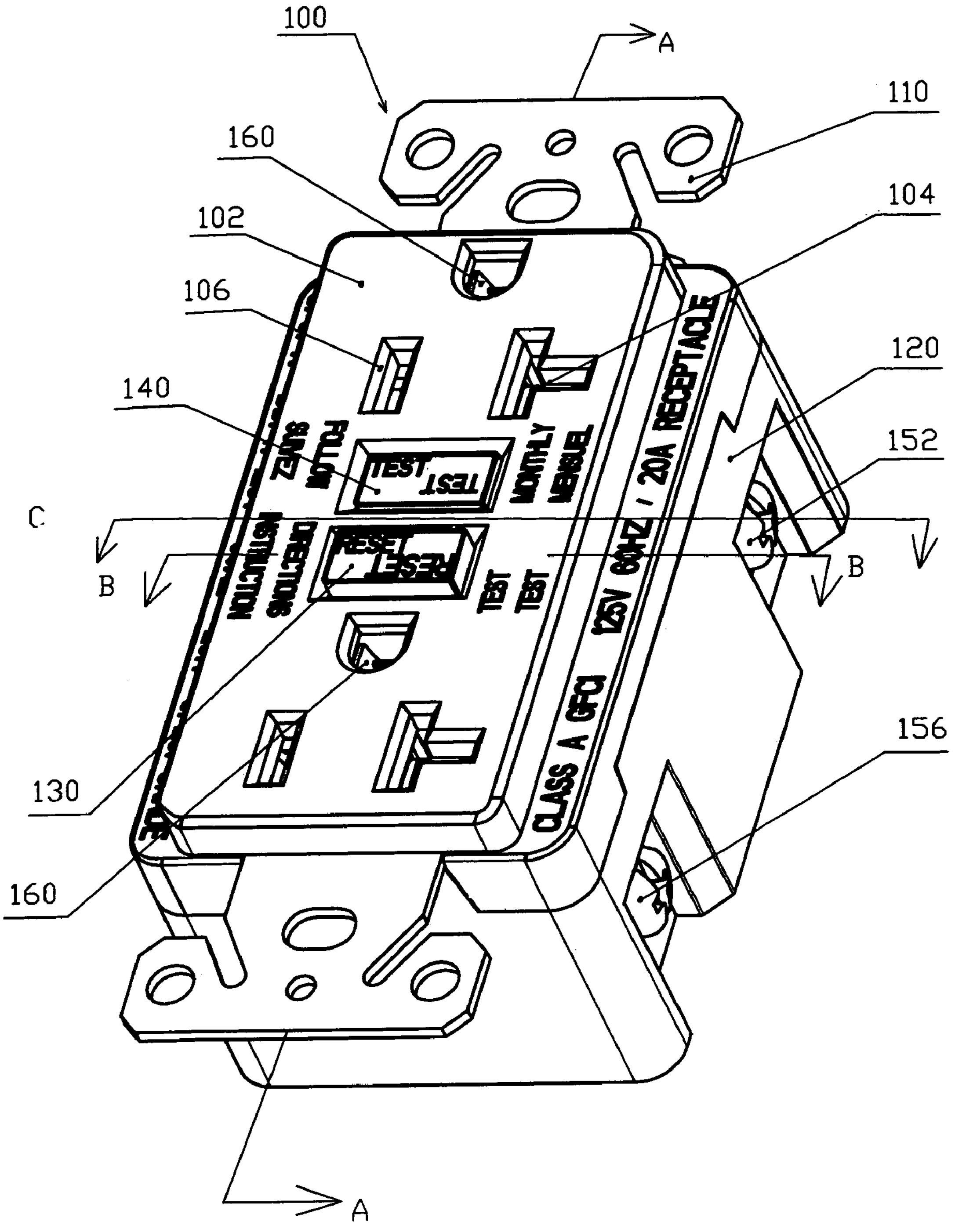
FIG. 1 is a perspective view of an exemplary embodiment of a current interrupter.
Figure 2:
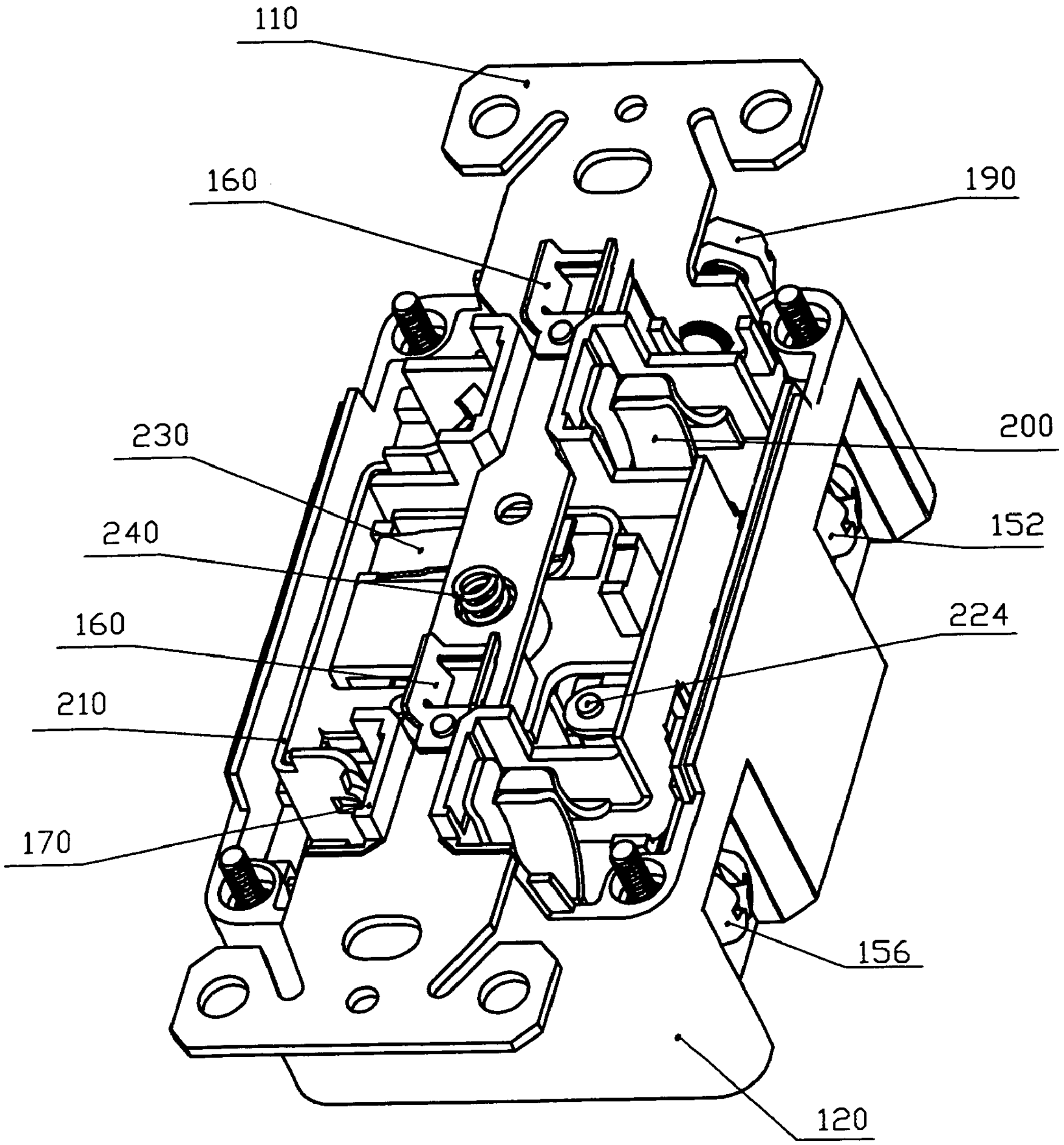
FIG. 2 is a perspective view of the current interrupter in FIG. 1 with a face portion removed, illustrating the internal configuration.

As shown in FIG. 1, an exemplary embodiment 100 of a ground fault current interrupter (GFCI) receptacle has a housing which comprises a face portion 102, a middle body 170 (shown in FIG. 2), and a rear portion 120. The face portion 102 has entry ports 104, 106 for receiving normal or polarized prongs of a male plug, as well as ground-prong-receiving openings 160 to accommodate a three-wire plug. The receptacle 100 contains a mounting strap 110 used to fasten the receptacle to a junction box. As shown in FIG. 2, the mounting strap 110 has a threaded opening to receive a ground screw 190 for connecting to an external ground wire.

A reset button 130 extends through an opening in the face portion 102 of the housing. The reset button 130 is used to activate a reset operation which re-establishes the electrical continuity in open conductive paths. A test button 140 extends through an opening in the face portion 102 of the housing. The test button 140 is used to break the electrical continuity in close conductive paths by simulating a fault condition.

Figure 14:
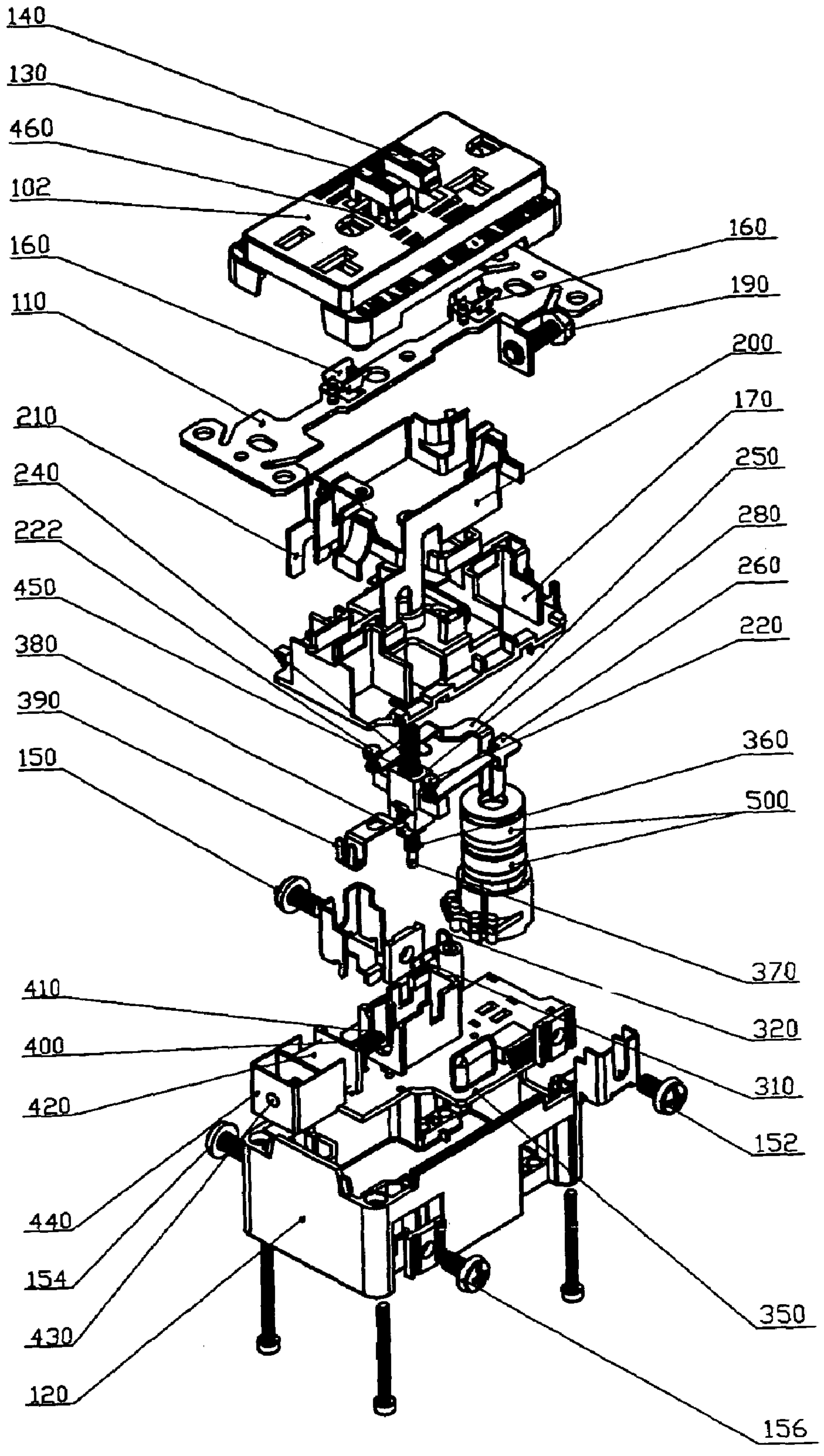
FIG. 14 is an exploded view of the current interrupter in FIG. 1.

As shown in FIGS. 1 and 14, electricity connects to the GFCI receptacle 100 through binding screws 150, 152, 154, and 156 where the binding screw 150 is a line phase connection, the binding screw 152 is a line neutral connection, the binding screw 154 is a load phase connection, and the binding screw 156 is a load neutral connection. In addition to binding screws, people in the art will appreciate other types of wiring terminals such as set screws, pressure clamps, pressure plates, push-in type connections, pigtails, and quick-connect tabs.

Figure 3:
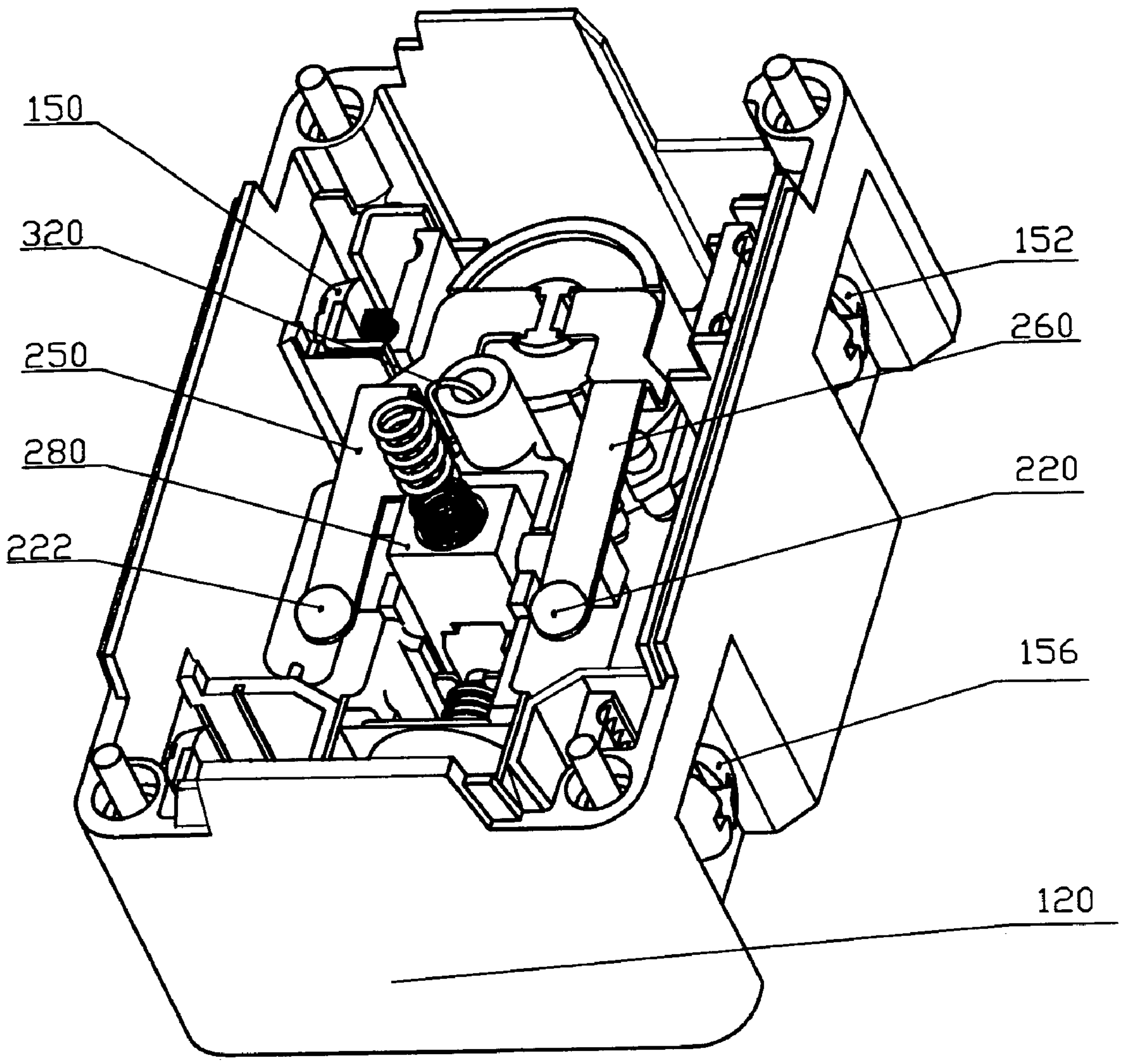
FIG. 3 is a perspective view of the current interrupter in FIG. 2 with a mounting strap and a middle body removed, further illustrating the internal configuration.
Figure 4:
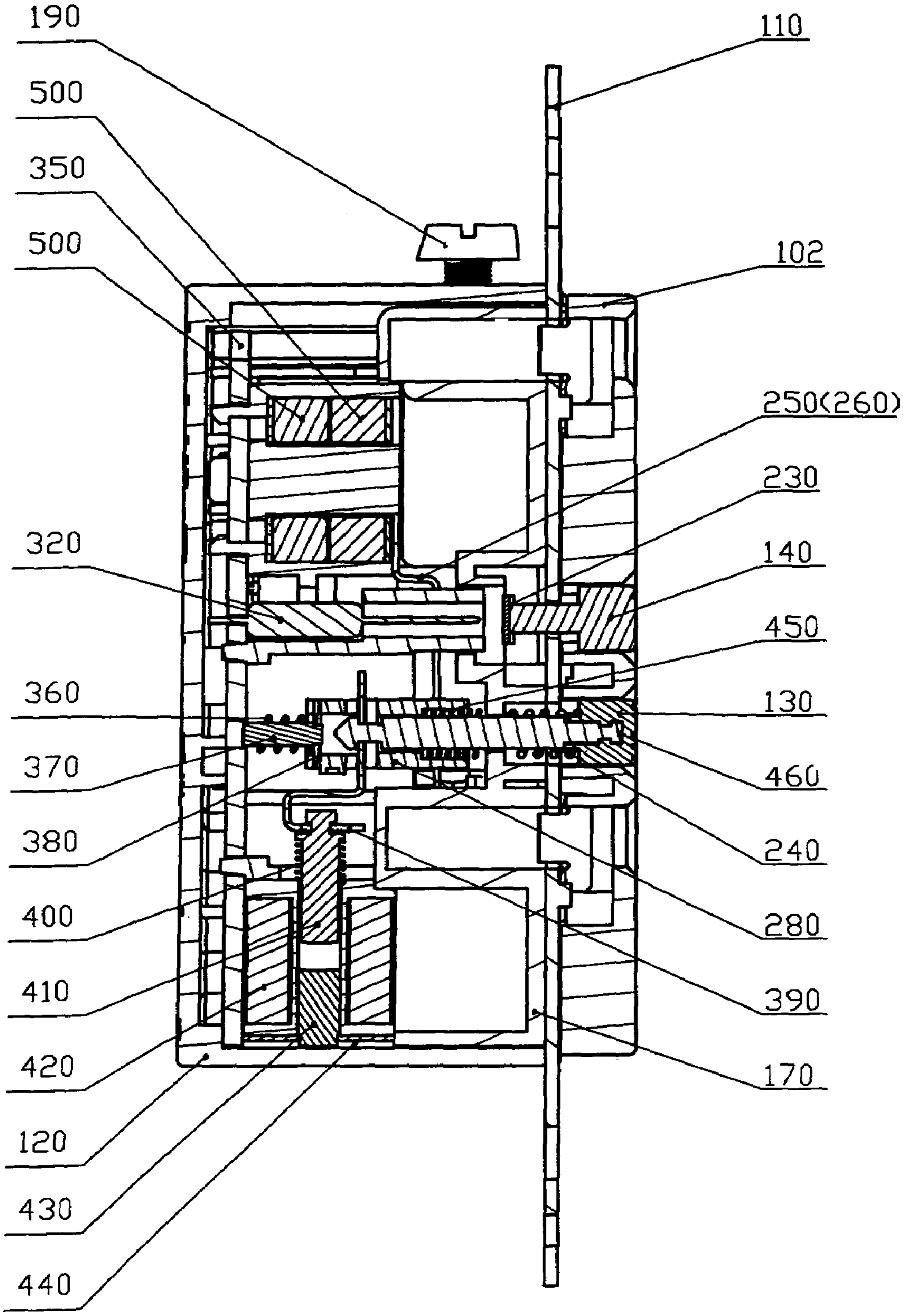
FIG. 4 illustrates a cross-sectional view of the current interrupter in FIG. 1 along the AA line in a reset condition.
Figure 8A:
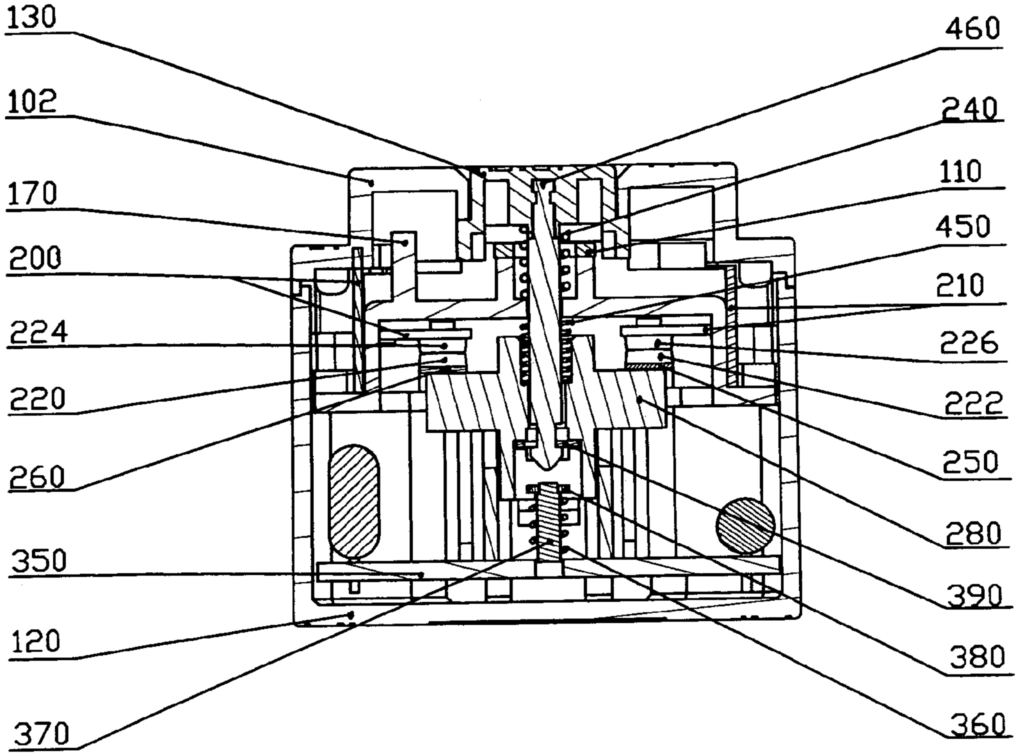
FIG. 8A illustrates a cross-sectional view of the current interrupter in FIG. 1 along the BB line in a reset condition.
Figure 8B:
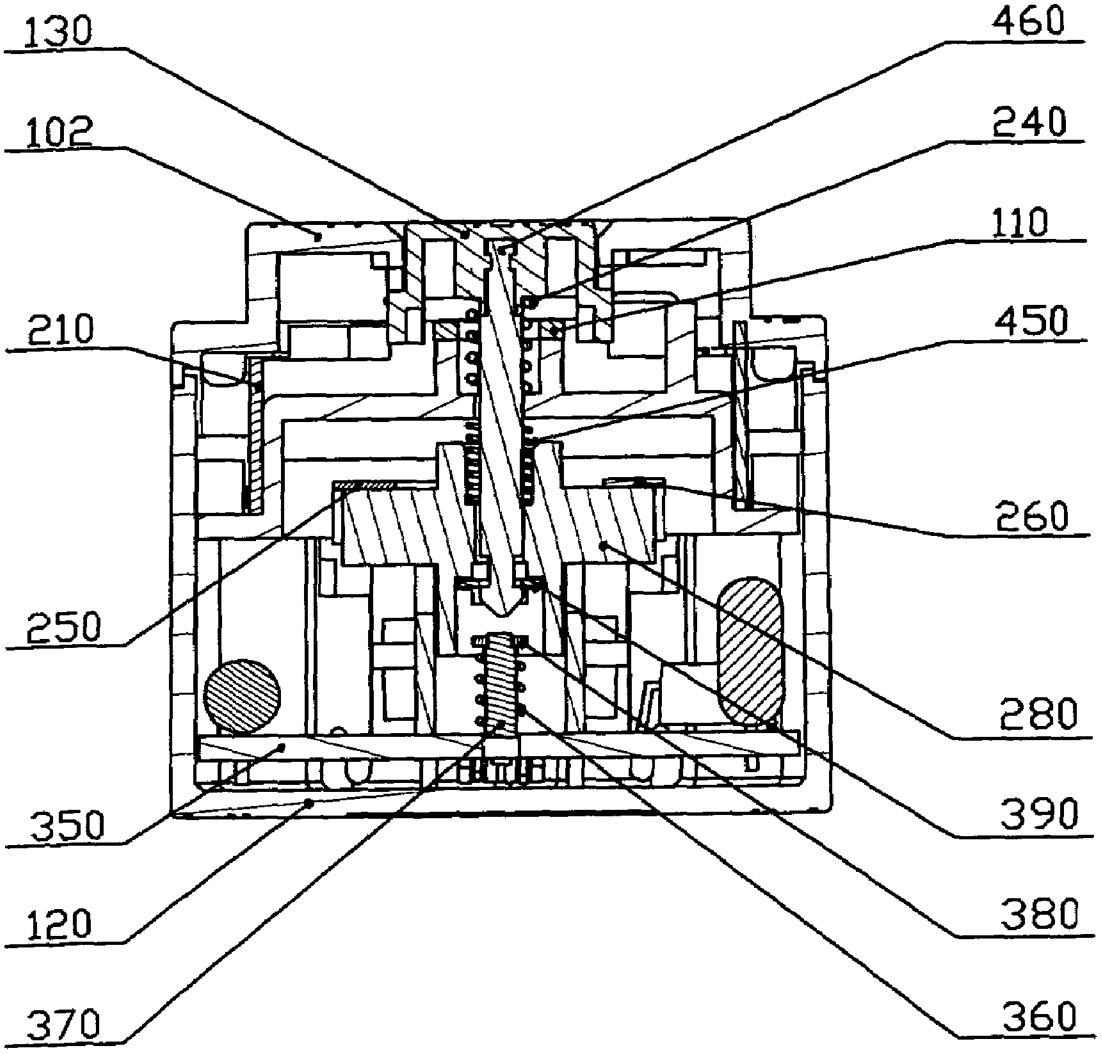
FIG. 8B illustrates a cross-sectional view of the current interrupter in FIG. 1 along the opposite direction of BB line in a reset condition.
Figure 9:
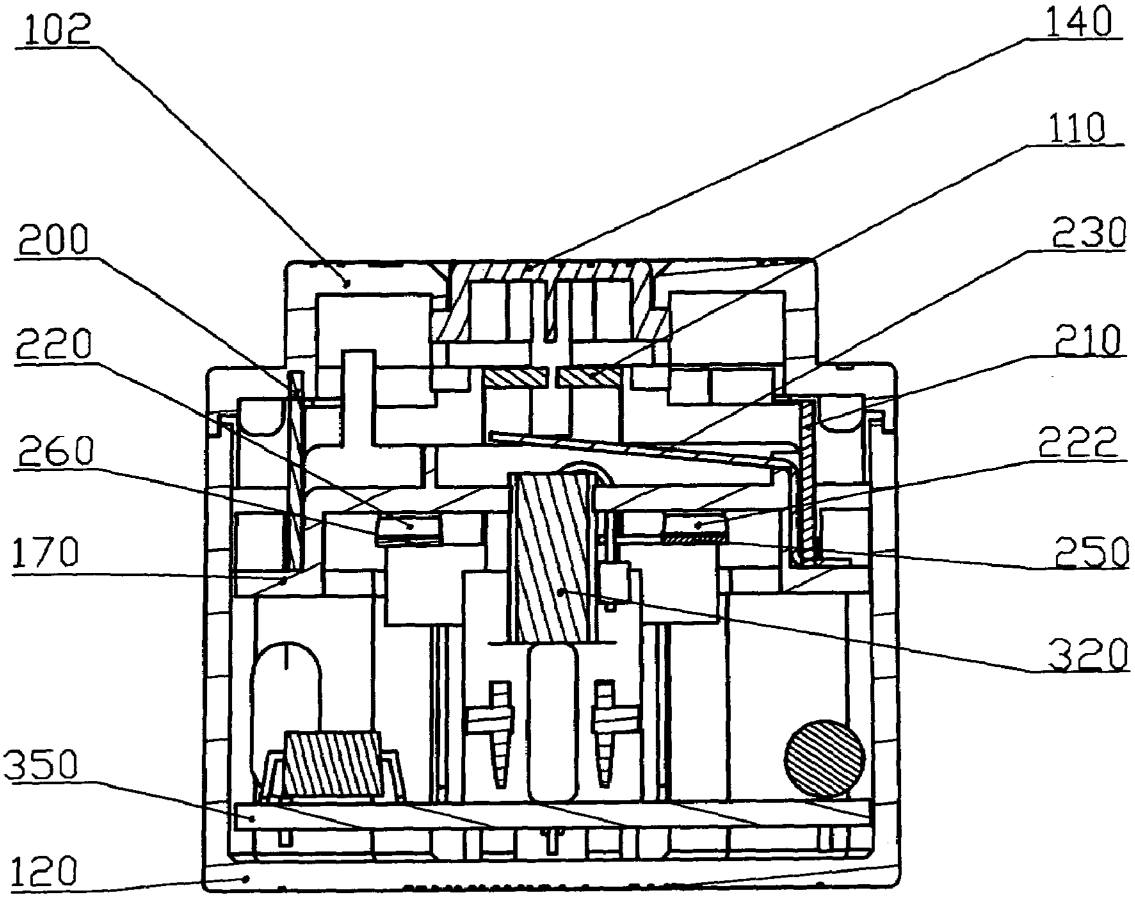
FIG. 9 illustrates a cross-sectional view of the current interrupter in FIG. 1 along the CC line with a test component.
Figure 10:
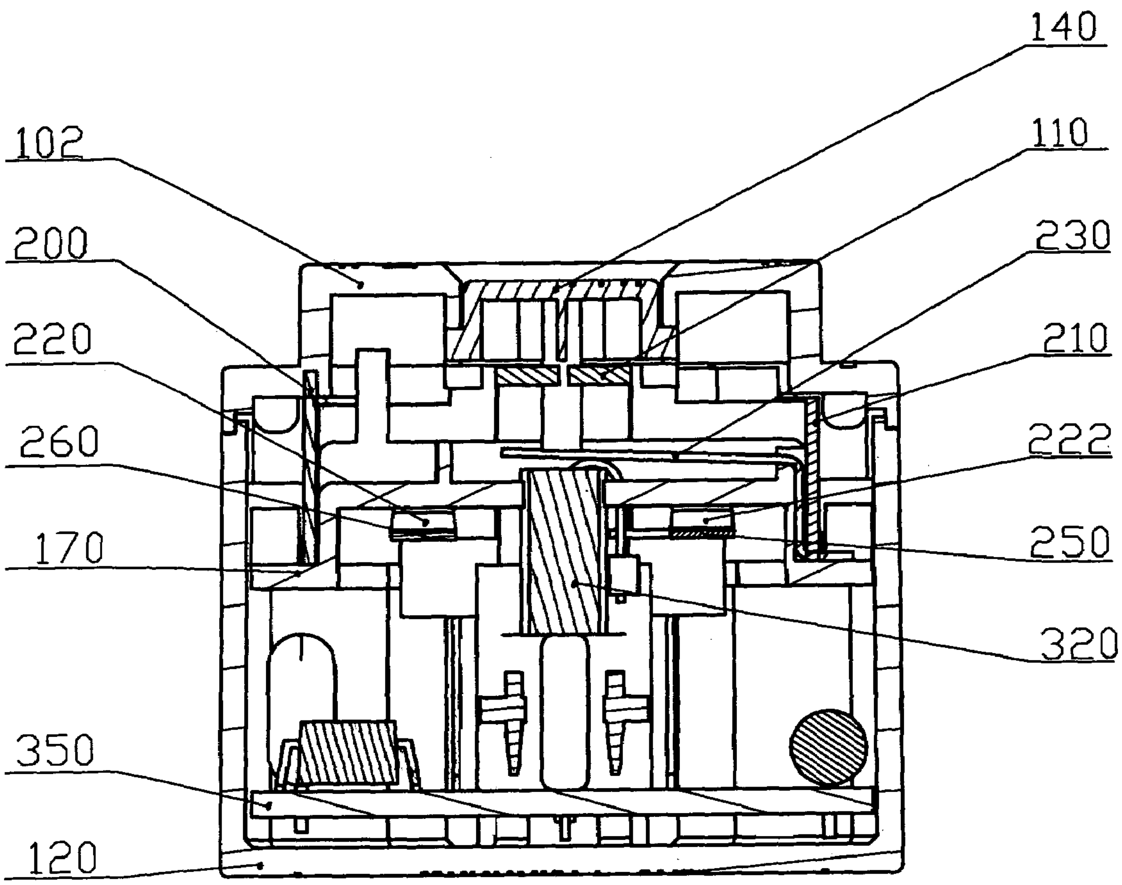
FIG. 10 illustrates a cross-sectional view of the current interrupter in FIG. 1 along the CC line in a transient condition when a test button is pressed.

As shown in FIGS. 2, 3, and 8A, the conductive path between the line neutral connection 152 and the load neutral connection 156 comprises a right movable contact strip 260 with one end electrically coupled to the line neutral connection 152 and the other end movable to establish and break the electrical continuity, a right movable contact 220 mounted onto the movable end of the right movable contact strip 260, a right fixed contact strip 200 electrically coupled to the load neutral connection 156, and a right fixed contact 224 mounted onto the right fixed contact strip 200. A user accessible load neutral connection contains binding terminals capable of engaging a prong of a male plug inserted therebetween. The conductive path between the line neutral connection 152 and the user accessible load neutral connection comprises a right movable contact strip 260 with one end electrically coupled to the line neutral connection 150 and the other end movable to establish and break the electrical continuity, a right movable contact 220 mounted onto the movable end of the right movable contact strip 260, a right fixed contact strip 200 electrically coupled to the binding terminals, and a right fixed contact 224 mounted onto the right fixed contact strip 200.

Similarly, the conductive path between the line phase connection 150 and the load phase connection 154 comprises a left movable contact strip 250 with one end electrically coupled to the line phase connection 150 and the other end movable to establish and break the electrical continuity, a left movable contact 222 mounted onto the movable end of the left movable contact strip 250, a left fixed contact strip 210 electrically coupled to the load phase connection 154, and a left fixed contact 226 mounted onto the left fixed contact strip 210. A user accessible load phase connection contains binding terminals capable of engaging a prong of a male plug inserted therebetween. The conductive path between the line phase connection 150 and the user accessible load phase connection comprises a left movable contact strip 250 with one end electrically coupled to the line phase connection 150 and the other end movable to establish and break the electrical continuity, a left movable contact 222 mounted onto the movable end of the left movable contact strip 250, a left fixed contact strip 210 electrically coupled to the binding terminals, and a left fixed contact 226 mounted onto the left fixed contact strip 210.

Figure 11:
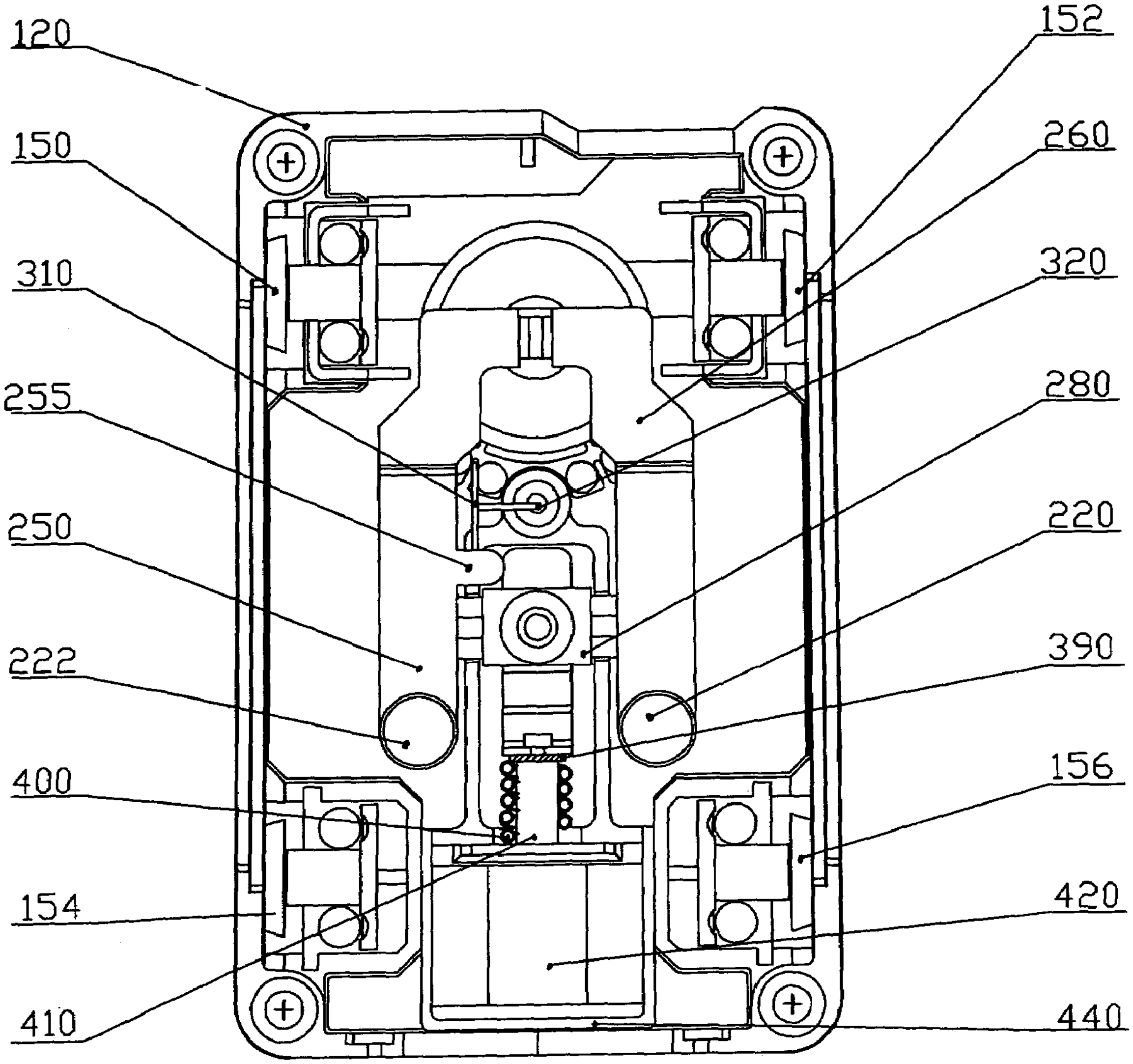
FIG. 11 is a top view of the current interrupter in FIG. 3.
Figure 12:
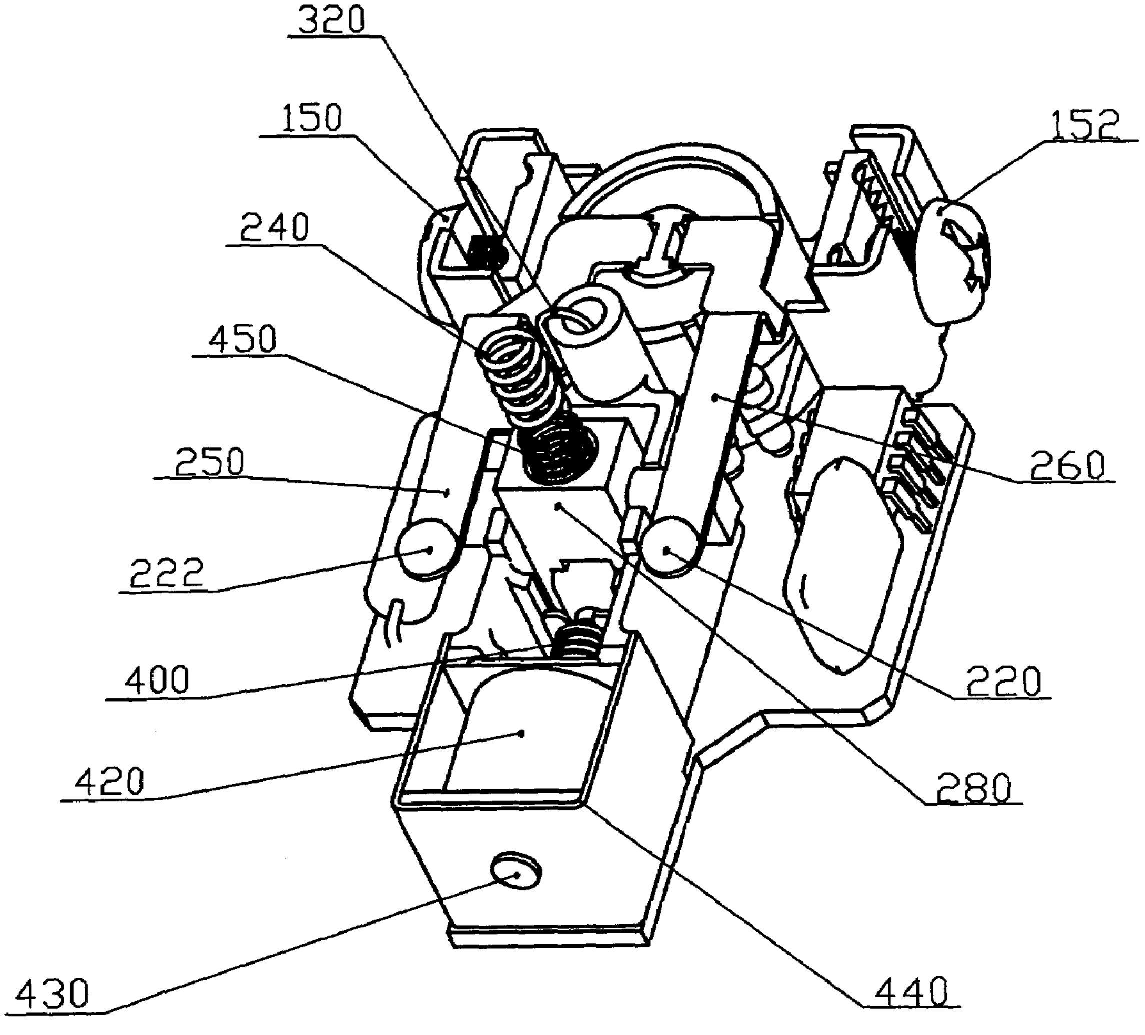
FIG. 12 is a perspective view of the current interrupter in FIG. 3 with a rear portion removed.

As shown in FIGS. 1–14, the GFCI receptacle 100 contains the movable contact strips 250, 260, the fixed contact strips 200, 210, a reset component, a test component, a movable component, and a tripping component. The left movable contact strip 250 has a protruding contact 255 (shown in FIG. 11) for the reset operation. The tripping component has a reset contact 310 to contact the protruding contact 255 in order to perform the reset operation. When the reset button 130 of the reset component is pressed, the reset component moves down and causes the protruding contact 255 to contact the reset contact 310. The tripping component is then activated to latch the reset component with the movable component. When the reset button 130 is released, the reset component moves up and brings the movable component up together. The movable component further pushes the movable ends of the movable contact strips 250, 260 up to a position where movable contacts 220, 222 maintain a good contact with corresponding fixed contacts 224, 226. Accordingly, the reset operation re-establishes the electrical continuity. When the test button 140 is pressed, the test component activates the tripping component to release the reset component from the movable component. The movable component moves down and causes the movable contacts 220, 222 to separate from the fixed contacts 224, 226. Accordingly, the test operation simulates a fault condition to break the electrical continuity.

The reset component comprises the reset button 130, a reset shaft 460, and a reset spring 240. One end of the reset shaft 460 is molded into the underside of reset button 130 and the other end extends through the middle body 170 into the movable component. The reset spring 240 surrounds an upper portion of the reset shaft 460 and is partially disposed in a cup-shape portion of the middle body 170. Thus, one end of the reset spring 240 props up the reset button 130 and the other end presses onto an upper surface of the middle body 170. In other words, the reset spring 240 is restricted between the reset button 130 and the middle body 170.

The movable component mainly disposed under the reset component comprises a movable assembly 280 and a latching plate 390. The movable assembly 280 has sustaining portions 282, 284 (shown in FIG. 13) extending under the movable ends of the movable contact strips 260, 250, respectively. As a result, when the movable assembly 280 moves up, the movable ends of the movable contact strips 260, 250 are brought up to a position so that the movable contacts 220, 222 maintain a good contact with the fixed contacts 224, 226.

Figure 13:
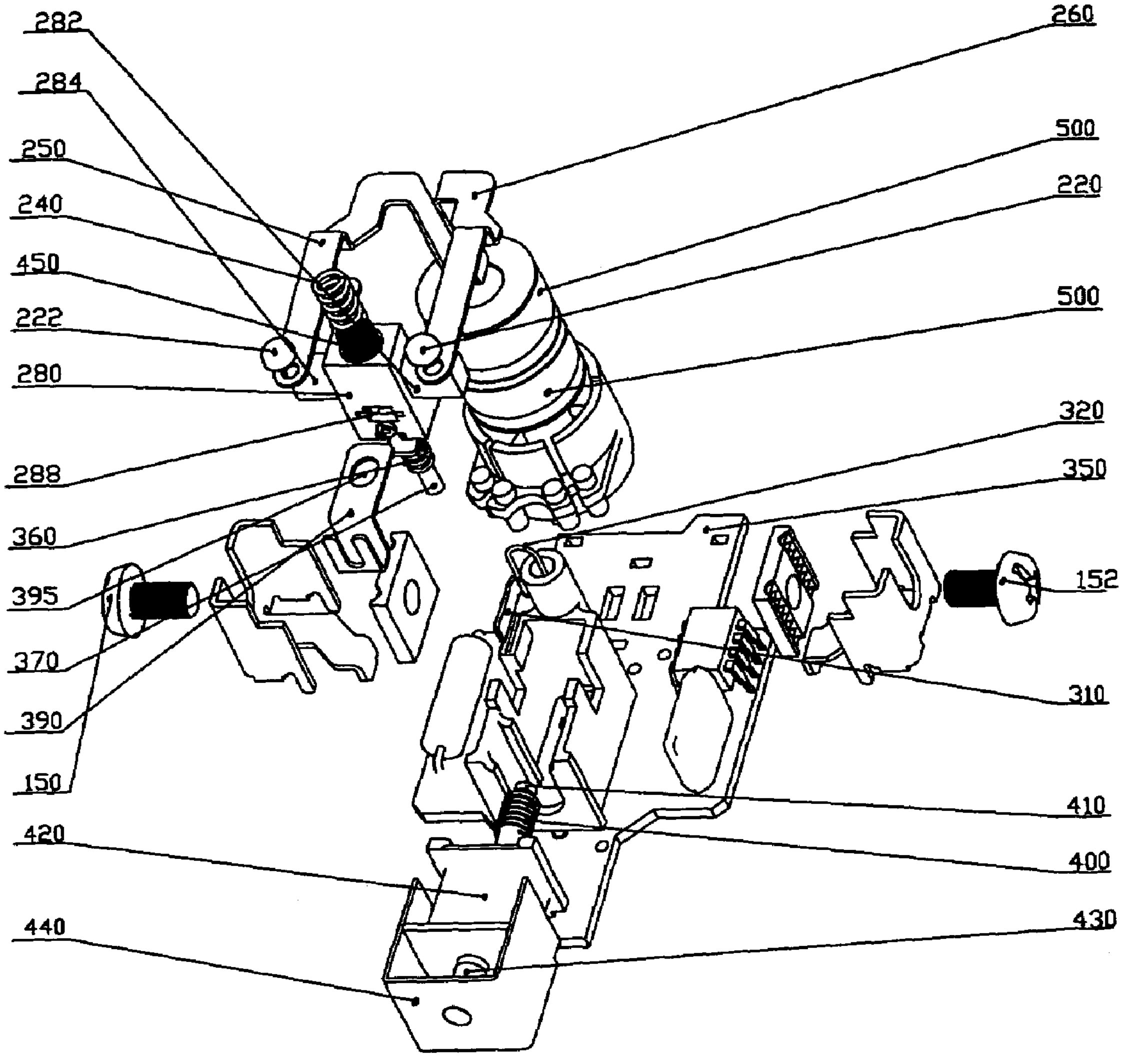
FIG. 13 is an exploded view of the current interrupter in FIG. 12.

As shown in FIG. 13, the movable assembly 280 has a cavity, a middle spring 450, a pair of latching slots 288, a reverse shaft 370, and a reverse spring 360. The cavity with an opening on the top accommodates a lower portion of the reset shaft 460. An upper portion of the cavity is wider so that the middle spring 450 can partially sit in and surround the lower portion of the reset shaft 460. As a result, the middle spring 450 is restricted between a lower surface of the middle body 170 and the inner wall of the cavity. The reverse shaft 370 has one end attached to and under a lower plate 380 of the movable assembly 280 and the other end penetrating into a circuit board 350. The reverse spring 360 surrounds the reverse shaft 370 and is restricted between the lower plate 380 of the movable assembly 280 and the circuit board 350. The pair of latching slots 288 are disposed on both side walls of the movable assembly 280 allowing the latching plate to extend through the movable assembly 280.

The latching plate 390 has a latching portion with a latching hole 395 and a clasp portion with a clasp opening. The latching portion extends through the movable assembly 280 via the latching slots 288. The latching hole 395 is disposed on the latching portion so that the reset shaft 460 can penetrate the latching hole 395 and latches with the latching plate 390 when the GFCI receptacle 100 is in a reset condition. The clasp opening is arranged to allow the latching plate 390 to be able to move up and down while remaining to be clasped with the tripping component. In this embodiment, the clasp portion has a U-shaped opening.

The tripping component comprises a trip shaft 410, a trip spring 400, an electromagnetic unit, and a control circuit. The electromagnetic unit contains a trip coil 420, magnetic shaft 430, and a metal shield 440. The trip shaft 410 has one end clasped with the U-shaped clasp opening in the clasp portion of the latching plate 390 and the other end disposed inside the trip coil 420. The trip spring 400 surrounds the trip shaft 410 and is restricted between the trip coil and a wider portion of the trip shaft 410 close to the end clasped with the latching plate 390. The magnetic shaft 430 is mainly disposed inside the trip coil 420 and has one end extended through the metal shield 440. The metal shield 440 covers at least two sides of the trip coil 420 and is abutted against one side of the rear portion 120. When activated by the control circuit, the electromagnetic unit pulls the trip shaft 410 which in turn pulls the latching plate 390 so that the reset shaft 460 can be latched with or released from the latching hole 395. The control circuit activates the electromagnetic unit upon detecting a ground fault condition, a test request, and a reset request. The control circuit has a sensing coil and a neutral coil to detect a fault condition. The control circuit has a reset contact 310 electrically coupled to a test resistor 320. When the protruding contact 255 of the left movable contact strip 250 contacts the reset contact 310 to close a circuit and generate a diverted current, the control circuit activates the electromagnetic unit to perform the reset operation. Similarly, the control circuit activates the electromagnetic unit when a test strip 230 is pressed down to contact a test resistor 320 and to form a close circuit.

Figure 5:
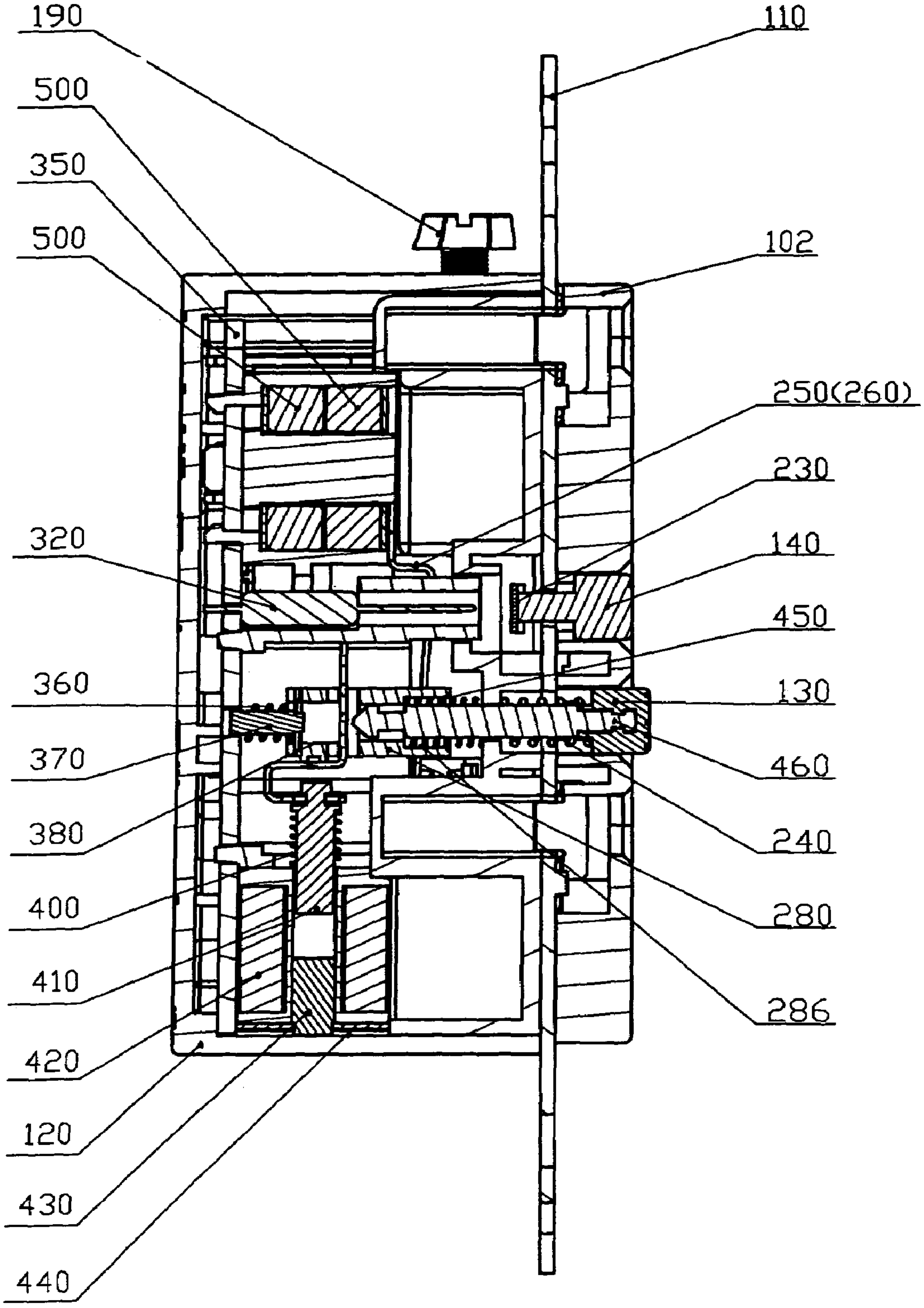
FIG. 5 illustrates a cross-sectional view of the current interrupter in FIG. 1 along the AA line in a tripped condition.
Figure 6:
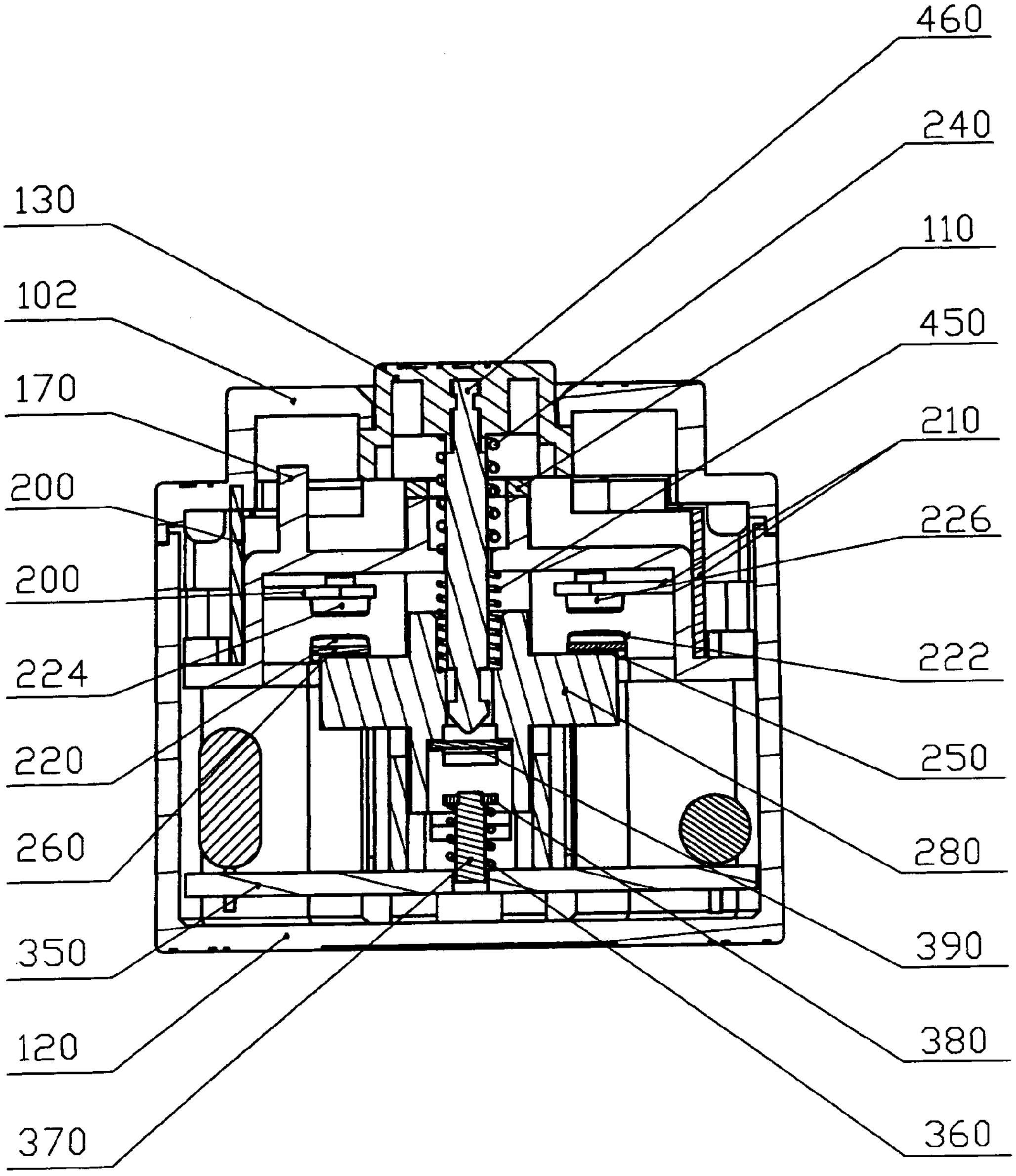
FIG. 6 illustrates a cross-sectional view of the current interrupter in FIG. 1 along the BB line in a tripped condition.
Figure 7:
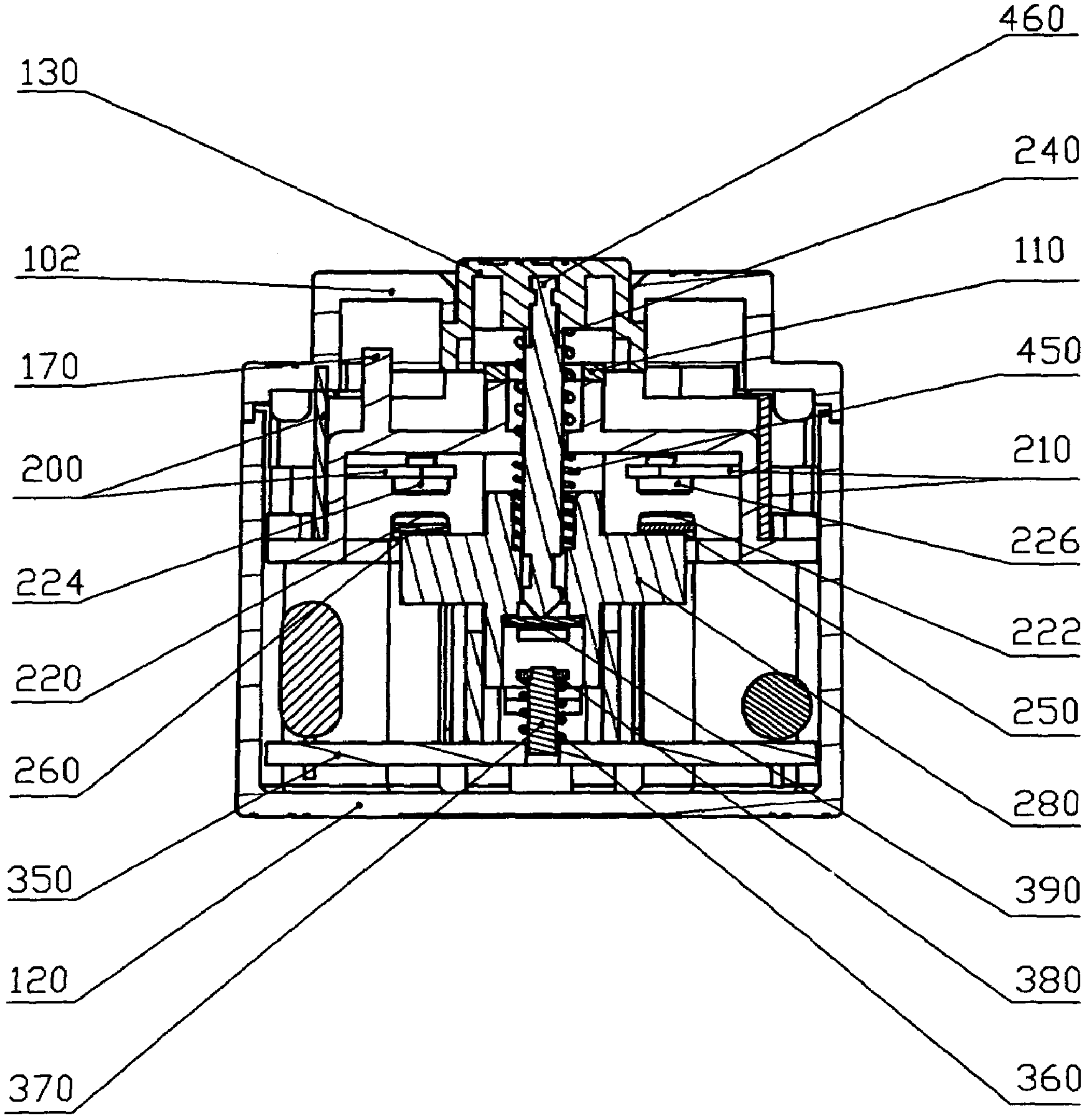
FIG. 7 illustrates a cross-sectional view of the current interrupter in FIG. 1 along the BB line in a transient condition when a reset button is pressed.

The GFCI receptacle 100 is originally stable at a trip condition as shown in FIGS. 5 and 6. The movable assembly is at a first position where movable ends of the movable contact strips 250, 260 stay on the sustaining portion of the movable assembly 280 and are separated from the fixed contact strips 200, 210 and the reset contact 310. The movable assembly 280 is at a stabilized position due to the balance among the reset spring 240, the middle spring 450, and the reverse spring 360.

After the GFCI receptacle 100 is correctly wired, the reset button 130 is pressed to establish the electrical continuity in the conductive paths. When the reset button 130 is pressed, the reset shaft 460 moves down to push onto a surface of the latching plate 390. The latching plate 390 brings the movable assembly 280 to move down. The movable ends of the movable contact strips 250, 260 move down due to their own elasticity and causes the protruding contact 255 to contact with the reset contact 310. The movable assembly 280 is at a transient second position where the movable ends of the movable contact strips 250, 260 are separated from the fixed contact strips 200, 210 and the protruding contact 255 of the left movable contact strip 250 contacts the reset contact 310.

Because of the close circuit resulted from the contact, the control circuit activates the electromagnetic unit to pull the trip shaft 410. The trip shaft 410 then pulls the latching plate 390 by overcoming friction force between the reset shaft 460 and the latching plate 390 as well as the elastic force from the pressed trip spring 400. When the latching hole 395 moves to a position right under the reset shaft 460, a head portion of the reset shaft 460 penetrates the latching hole 395. At the moment, because the pressure given onto the latching plate 390 by the reset shaft 460 vanishes, the pressed reverse spring 360 bounces back to move the movable assembly 280 up. The sustaining portion 284 of the movable assembly pushes the left movable contact strip 250 up so that the protruding contact 255 separates from the reset contact 310. Because of the open circuit resulting from the separation, the control circuit inactivates the electromagnetic unit to cease the pulling force. The pressed trip spring 400 then bounces back to push the latching plate 390 and causes a neck portion of the reset shaft 460 to latch with the latching hole 395.

When the reset button is released, the pressed reset spring 240 bounces back to move up the reset shaft 460. The reset shaft 460 brings up the movable assembly 280 through the latching plate 390 that latches with the reset shaft 460. Overcoming the elastic forces from the pressed middle spring 450 and the movable contact strips 250, 260, the movable assembly 280 with the sustaining portions 282, 284 pushes the movable ends of the movable contact strips 260, 250 to a position where the movable contacts 220, 222 maintain a good contact with the respective fixed contacts 224, 226. The movable assembly 280 is then at a third position when the GFCI receptacle 100 is at a reset condition.

People in the art will appreciate that other elastic materials such as elastic tubes can be used to replace the reset spring 240, the middle spring 450, the reverse spring 360, and the trip spring 400. In this embodiment, the fixed contacts 224, 226 have a flat contact surface and the movable contacts 220, 222 have a protruding contact surface. The fixed contacts 224, 226 and the movable contacts 220, 222 comprise silver. In this embodiment, the contacting surfaces of the fixed contacts 224, 226 and the movable contacts 220, 222 are coated with silver alloy. People in the art understand that the fixed contacts 224, 226 and the movable contacts 220, 222 can be made in other shapes and by other materials. In this embodiment, the reset shaft 460 and the reverse shaft 370 comprise steel. The trip shaft 410 and the magnetic shaft 430 comprise iron. People in the art understand other materials can be used to make the reset shaft 460, the reverse shaft 370, the trip shaft 410, and the magnetic shaft 430. In this embodiment, when activated by the control circuit, the electromagnetic unit pulls the trip shaft 410 so that the reset shaft 460 can be latched with or released from the latching hole 395. However, people in the art appreciate that when activated by the control circuit, the electromagnetic unit can also push the trip shaft 410 to achieve the same results.

If the GFCI receptacle 100 has a reverse wiring, the control circuit is not supplied with electricity to activate the electromagnetic unit when the protruding contact 255 of the left movable contact strip 250 contacts the reset contact 310. When the GFCI receptacle 100 is in a trip condition, the control circuit is connected to the line side of the GFCI receptacle 100 only and is not connected to the load side. As a result, if the line wires are connected to the load side of the GFCI receptacle 100, no power supply is provided to the control circuit and the reset function is disabled. In detail, because the latching plate 390 is not pulled to allow the reset shaft 460 to penetrate the latching hole 395, the reset shaft 460 does not latch with the latching plate 390. Thus, when the reset button 130 is released, due to the elastic force from the pressed reset spring 240, the reset shaft 460 moves up alone without bringing up the movable assembly 280. When the latching plate 390 is not pressured by the reset shaft 460, the pressed reverse spring 360 bounces back to move up the movable assembly 280. After the elastic forces from the reverse spring 360, the middle spring 450, and the movable contact strips 250, 260 reach a balance, the movable assembly 280 comes back to the first position where movable ends of the movable contact strips 260, 250 separate from the fixed contact strips 200, 210 and the reset contact 310. The GFCI receptacle 100 remains in the trip condition. Failure to reset the GFCI receptacle 100 provides a warning of the reverse wiring. When an installer cannot reset the GFCI receptacle 100, he realizes that it is wrongly wired and is able to correct the wiring instantly. However, if the installer ignores the warning of the reverse wiring and does not correct the wiring, the GFCI receptacle 100 can only function as a normal receptacle without ground fault protection.

A test mechanism is installed to test whether the electrical continuity can be broken by simulating a ground fault condition. The test component comprises the test button 140 and the test strip 230. One end of the test strip 230 is electrically coupled to the left fixed contact strip 210 and the other end hangs under the test button 140. When the electrical continuity is established and the test button 140 is pressed, the test button 140 pushes the test strip 230 down to contact the test resistor 320 of the control circuit. As a result, the control circuit activates the electromagnetic unit to pull the trip shaft 410. Overcoming the elastic force from the trip spring 400, the trip shaft 410 pulls the latching plate 390 to release the reset shaft 460 from the latching hole 395. The pressed reset spring 240 further moves the reset shaft 460 and the reset button 130 up. After releasing from the reset shaft 460, the movable assembly 280 and the latching plate 390 move down due to the elastic forces from the pressed middle spring 450 and the movable contact strips 260, 250. The movable ends of the movable contact strips 260, 250 move down and separate from the fixed contact strips 200, 210. When the downward elastic force balances the upward elastic force from the pressed reverse spring 360, the movable assembly 280 is stabilized at the first position where the movable ends of the movable contact strips 260, 250 separate from the fixed contact strips 200, 210 and the reset contact 310. As a result, the electrical continuity is broken and the GFCI receptacle 100 is in a trip condition.

When the control circuit detects a ground fault condition, it activates the electromagnetic unit to pull the trip shaft 410. The remaining process is the same as that of the test operation.

Figure 15:
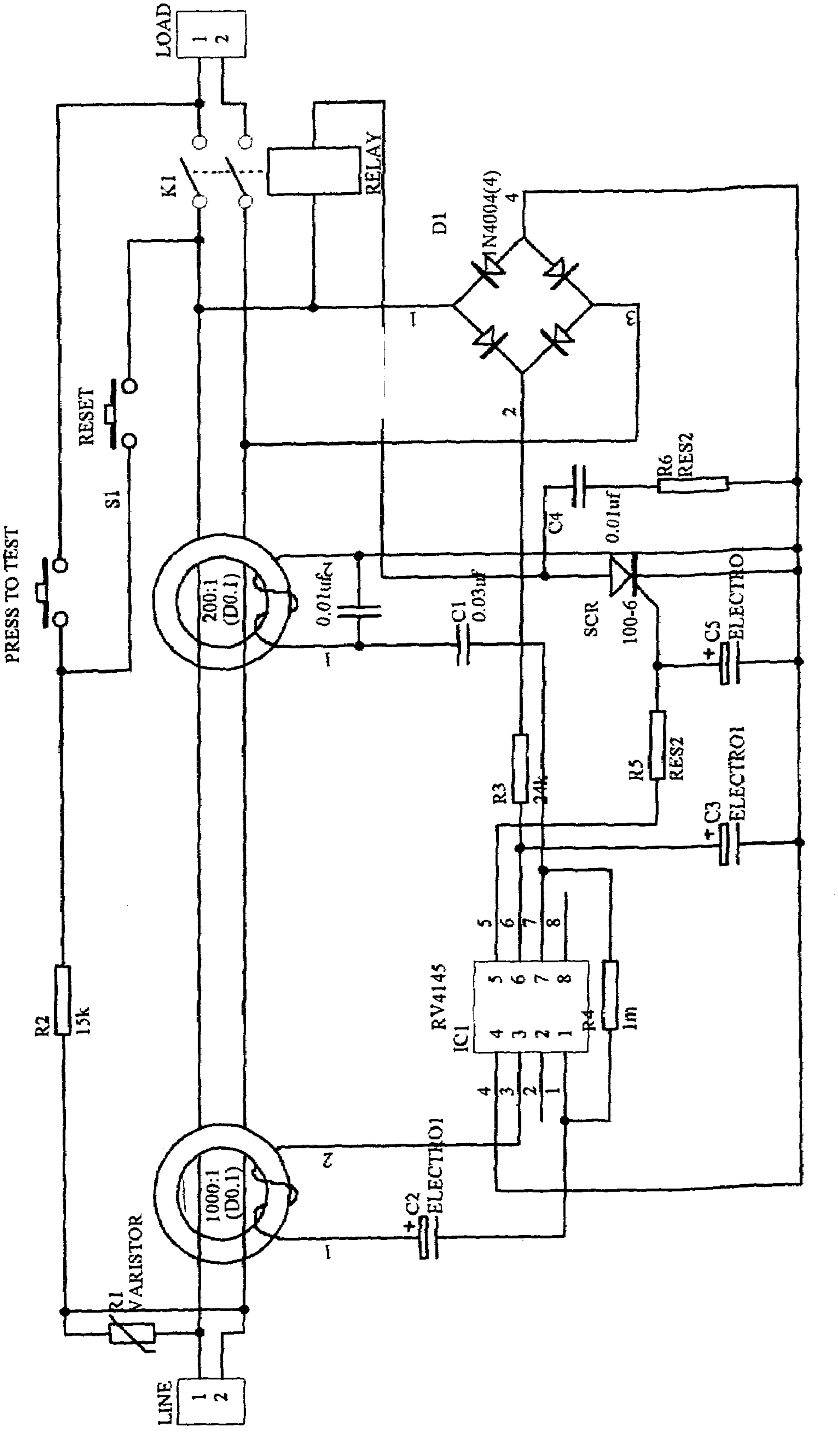
FIG. 15 is a schematic diagram of a control circuit in the current interrupter in FIG. 1.

FIG. 15 shows an exemplary embodiment of the control circuit and its relationship with other components of the GFCI receptacle 100. Line 1 is the line phase connection and line 2 is the line neutral connection. Similarly, load 1 is the load phase connection and load 2 is the load neutral connection. The phase and neutral conductive paths of the line side pass through both a sensing transformer U1 and a neutral transformer U2 (collectively 500 as shown in FIG. 14) that are used to detect the imbalance of the currents between the phase and the neutral conductive path.

A resistor R4 connects between the terminal 1 and terminal 7 of an RV 4145 IC. The magnitude of the resistor R4 determines the threshold value for the tripping action of the GFCI receptacle 100 to occur. In other words, if the control circuit detects a current imbalance greater than the threshold value, it activates the electromagnetic unit to break the electrical continuity. In this embodiment, the threshold value is about 4–6 mA.

In the absence of a ground fault condition, the currents following through the phase and neutral conductive paths are equal and opposite. No net flux is generated in the core of the sensing transformer U1. In the event that the current is diverted because of another electrical connection between the phase conductor of the load side and the ground, the currents flowing through the phase and neutral conductors are unequal and a net flux is generated. When the flux reaches the threshold value determined by the resistor R4, the terminal 5 of the IC generates a signal to activate the trip coil 420 of the electromagnetic unit ("Relay" shown in FIG. 15). As a result, the trip shaft 410 pulls the latching plate 390 so that the reset shaft 460 releases from the latching plate 390 and the electrical continuity between fixed contacts and movable contacts is interrupted.

When the GFCI receptacle 100 is in a trip condition and the reset button 130 is pressed, a diverted current flows from line 1 through the test resistor 320 ("R2" shown in the FIG. 15) and the protruding contact 255 to the line 2. An imbalance of the currents flowing through the phase and neutral conductive paths is generated so that terminal 5 of the IC sends a signal to activate the trip coil 420 of the electromagnetic unit. As mentioned above, because the trip shaft 410 pulls the latching plate 390 to latch the reset shaft 460 with the latching hole 395, the movable assembly 280 moves up to the third position where the movable contacts 220, 222 maintain a good contact with the respective fixed contacts 224, 226. The electrical continuity is established.

When the GFCI receptacle 100 is in a reset condition and the test button 140 is pressed, a diverted current flows from line 1 through the test resistor 320 (R2) and the test strip 230 to the line 2. An imbalance of the currents flowing through the phase and neutral conductive paths is generated so that terminal 5 of the IC sends a signal to activate the trip coil 420 of the electromagnetic unit. As mentioned above, because the trip shaft 410 pulls the latching plate 390 to release the reset shaft 460 from the latching hole 395, the movable assembly 280 moves down to the first position where the movable contacts 220, 222 separate from the respective fixed contacts 224, 226. The electrical continuity is broken.

Although the invention has been described in terms of exemplary embodiments, it is not limited thereto. The described embodiment is to be considered in all respects only as illustrative and not as restrictive. The present invention may be embodied in other specific forms without departing from its essential characteristics. The scope of the invention, therefore, is indicated by the appended claims rather than by the foregoing description. All changes which come within the meaning and range of the equivalents of the claims are to be embraced within their scope.

What is claimed is:

1. A circuit interrupter comprising:

a pair of fixed contact strips, each of the fixed contact strips having a fixed contact;

a pair of movable contact strips, each of the movable contact strips having a fixed end and a movable end, each of the movable ends having a movable contact arranged for contacting one of the fixed contacts;

a reset component comprising a reset button, a reset shaft attached to the reset button, and a first elastic tube surrounding an upper portion of the reset shaft;

a movable component comprising a movable assembly and a latching plate capable of being latched with the reset shaft and holding the movable assembly to move between different positions; and a trip component comprising a trip shaft capable of being clasped with the latching plate, a second elastic tube, an electromagnetic unit capable of moving the trip shaft, and a control circuit to activate the electromagnetic unit upon detecting a predetermined condition;

wherein when the reset button is pressed, one of the movable contact strips is capable of activating the electromagnetic unit to allow the reset shaft to penetrate and latch with the latching plate for reset operation.

2. The circuit interrupter of claim 1, further comprising:

a test component comprising a test button and a test strip, the test strip having one end hung under the test button and the other end electrically connected to the fixed contact strip.

3. A circuit interrupter, comprising:

a pair of fixed contact strips, each of the fixed contact strips having a fixed contact;

a pair of movable contact strips, each of the movable contact strips having a fixed end and a movable end, each of the movable ends having a movable contact arranged for contacting one of the fixed contacts;

a reset component comprising a reset button, a reset shaft attached to the reset button, and a first elastic tube surrounding an upper portion of the reset shaft;

a movable component comprising a movable assembly and a latching plate capable of being latched with the reset shaft and holding the movable assembly to move between different positions;

a trip component comprising a trip shaft capable of being clasped with the latching plate, a second elastic tube, an electromagnetic unit capable of moving the trip shaft, and a control circuit to activate the electromagnetic unit upon detecting a predetermined condition;

wherein the movable assembly comprises a sustaining portion extended under the movable ends of the movable contact strips, a cavity to accommodate a lower portion of the reset shaft, the third elastic tube surrounding the lower portion of the reset shaft, at least one latching slot for the latching plate to insert, a reverse shaft attached to a lower plate of the movable assembly, and the fourth elastic tube surrounding the reverse shaft.

4. The circuit interrupter of claim 3, wherein the latching plate comprises a latching portion and a clasp portion, the latching portion extending through the latching slot into the movable assembly and having a latching hole for the reset shaft to penetrate, the clasp portion outside the movable assembly having an opening for clasping.

5. The circuit interrupter of claim 4, wherein the clasping portion of the latching plate has a U-shape opening that is capable of moving up and down between different positions while the trip shaft remains clasped with the opening of the latching plate.

6. The circuit interrupter of claim 4, wherein:

the electromagnetic unit comprises a trip coil and a magnetic shaft disposed inside the trip coil;

the trip shaft is partially disposed inside the trip coil the electromagnetic unit, when activated, moving the trip shaft and compress the second elastic tube so that the reset shaft can penetrate into or remove from the latching hole.

7. The circuit interrupter of claim 3, wherein the first elastic tube is a reset spring, the second elastic tube is a trip spring, the third elastic tube is a middle spring, and the fourth elastic tube is a reverse spring.

8. The circuit interrupter of claim 7, wherein the reset spring has a larger elastic force than that of the middle spring.

9. The circuit interrupter of claim 7, further comprising:

a middle body disposed between the reset component and the movable component, the middle structure containing an opening through which the reset shaft penetrates;

a circuit board disposed under the reverse shaft, the circuit board containing an opening through which the reverse shaft can penetrate.

10. The circuit interrupter of claim 9, wherein the reset spring is restricted between the reset button and a upper surface of the middle body, the middle spring is restricted between the lower surface of the middle body and a inner wall of the cavity of the movable assembly, the reverse spring is restricted between a lower surface of the lower plate of the movable assembly and an upper surface of the circuit board; the trip spring is restricted between a wider portion of the trip shaft and the trip coil.

11. A circuit interrupter comprising:

a pair of fixed contact strips, each of the fixed contact strips having a fixed contact;

a pair of movable contact strips, each of the movable contact strips having a fixed end and a movable end, each of the movable ends having a movable contact arranged for contacting one of the corresponding fixed contacts;

a reset component having a reset shaft;

a movable means for being latched with or released from the reset component to move the movable ends of the movable contact strips between at least two different position, the movable means having a latching plate; and a tripping means, when activated, for moving a portion of the movable means to latch the reset component with the movable means or to release the reset component from the movable means;

wherein when the reset button is pressed, one of the movable contact strips is capable of activating the tripping means to allow the reset shaft to penetrate and latch with the latching plate for reset operation.

12. The current interrupter of claim 11, wherein the movable contact strip is capable of forming a close circuit to activate the tripping means and reset the current interrupter.

* * * * *